US006113072A

United States Patent [19]

Wickett

[11] Patent Number: 6,113,072

[45] Date of Patent: Sep. 5, 2000

[54] ACCESS PORT OR DRAIN PLUG WITH VALVE FOR LIQUID CONTAINERS

[76] Inventor: Geoffrey Malcolm Wickett, Unit 4, 86-88 West Str., Crows Nest NSW 2065, Australia

[21] Appl. No.: 09/117,642

[22] PCT Filed: Feb. 3, 1997

[86] PCT No.: PCT/AU97/00081

§ 371 Date: Oct. 13, 1998

§ 102(e) Date: Oct. 13, 1998

[87] PCT Pub. No.: WO97/28081

PCT Pub. Date: Aug. 7, 1997

[30] Foreign Application Priority Data

Feb. 1, 1996 [AU] Australia ........................ PN7846

[51] Int. Cl.[7] ........................ F16K 31/00

[52] U.S. Cl. ........................ 251/351; 251/144; 137/327

[58] Field of Search ........................ 251/351, 144; 137/327

[56] References Cited

U.S. PATENT DOCUMENTS

| | | | |
|---|---|---|---|
| 3,948,481 | 4/1976 | Pollock | 251/351 |
| 4,314,689 | 2/1982 | Wilson | 251/351 |
| 4,807,847 | 2/1989 | Martz | 251/144 |
| 5,096,158 | 3/1992 | Burdick et al. | 251/144 |
| 5,297,778 | 3/1994 | Morris et al. | 251/351 |
| 5,333,837 | 8/1994 | Reese | 251/216 |

*Primary Examiner*—A. Michael Chambers
*Assistant Examiner*—Thomas L. McShane
*Attorney, Agent, or Firm*—Norris, McLaughlin & Marcus P.A.

[57] ABSTRACT

An access port or drain for liquids held in a container, having a port member having a bore communicating with the interior of the container. A valve member seals the bore. A spigot member having an internal bore is adapted to connect by complementary connection means to valve member and to move the valve member inwardly of the container to open the valve such that liquid in the container is able to flow through the spigot member via opening in the spigot member.

6 Claims, 3 Drawing Sheets

ACCESS PORT OR DRAIN PLUG WITH VALVE FOR LIQUID CONTAINERS

BACKGROUND OF THE INVENTION

The present invention relates to a valve for liquids and in particular to a drain plug or access port for liquids held in a container.

In many situations in which liquid is stored in a container, or used as a coolant or lubricant such as oil in the sump of a car, or in circumstances where it is necessary to gain access to the liquid for testing or analysis purposes, an access port having a openable valve is necessary. However the existing ports are, usually, either expensive or messy in discharging the liquid.

SUMMARY OF THE INVENTION

The present invention seeks to ameliorate these disadvantages by providing an access port, adapted to allow access to liquid held in a container, comprising:

a port member having an internal bore therethrough;

a valve member adapted to move along said internal bore between a first sealing position where said internal bore is sealed and a second open position where liquid from said container is free to flow through said bore;

a first connection means located on said valve member;

a spigot member having an internal bore communicating between a first opening located adjacent a first end of said spigot member and a second opening located adjacent a second end of the spigot member;

a second connection means located at said first end of said spigot member, and adapted to engage with said first connection means, whereby in use with said second connection means engaged with said first connection, said spigot member is moved inwardly relative to the container forcing said valve member to its first open position and positioning said first opening of said spigot in communication with the liquid in the container, allowing the liquid to flow from said container out of the second opening of the spigot.

BRIEF DESCRIPTION OF THE DRAWINGS

The invention will now be described by way of example with reference to the accompanying drawings in which.

DETAILED DESCRIPTION OF THE INVENTION

One embodiment of the present invention is shown in the accompanying figures and is suitable for using as a draining port for draining the sump of a car of the spent oil.

Figure 1:
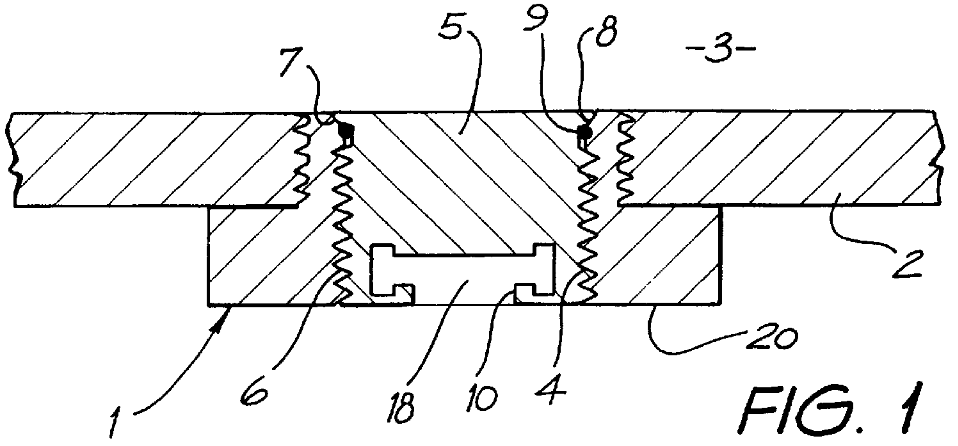
FIG. 1 illustrates a cross section through a schematic representation of a port member and valve according to one embodiment of the present invention.

As shown in FIG. 1 a port member (1) is threaded into the base (2) of the sump (3). The port member (1) could be fitted to the sump wall (2) in any suitable way and could also be integral with the wall of the container. The port member (1) has a threaded bore (4) therethrough, with a valve member (5) having its external threaded surface (6) engaging the threaded bore (4).

Figure 2:
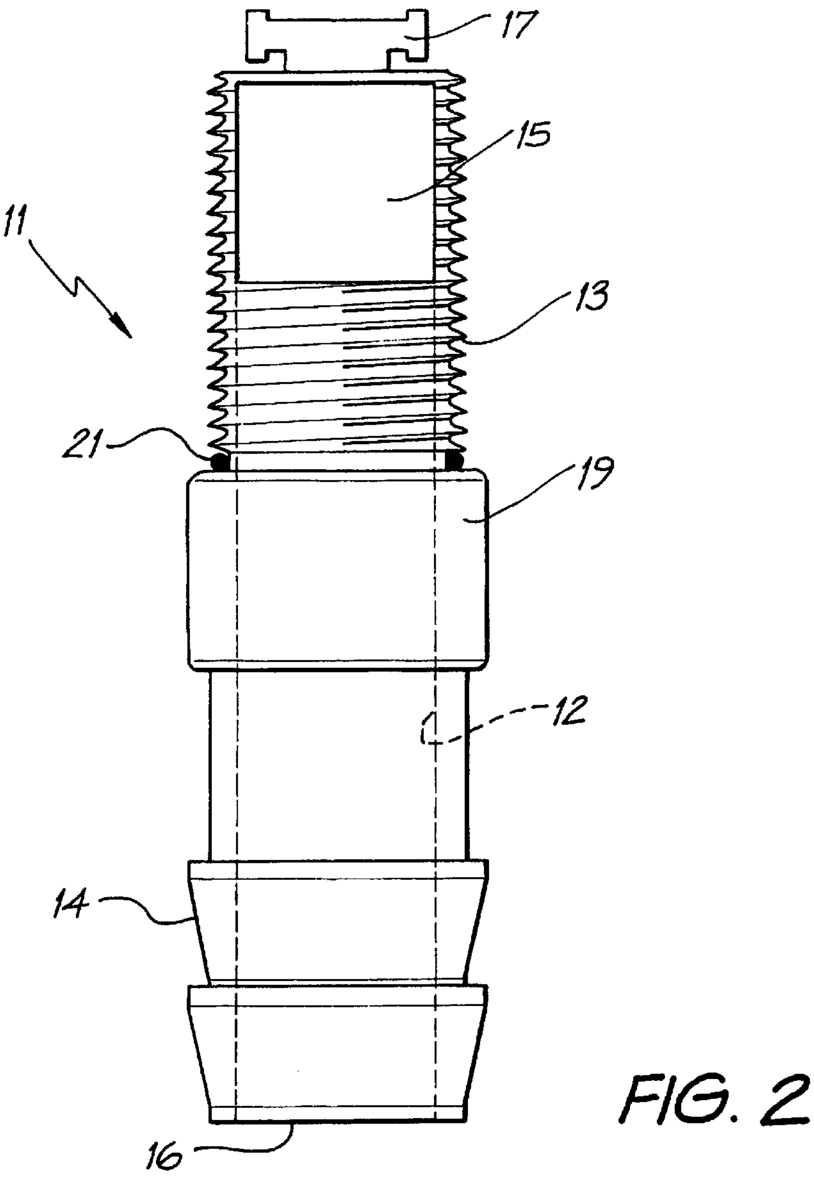
FIG. 2 illustrates a schematic representation of a spigot member, according to one embodiment of the present invention.

Located on the sump side of the threaded bore (4) is the tapered valve seat (7) against which the valve seal (8) abuts, compressing the o-ring (9) against the valve seat (7), to effect a liquid tight seal. At the other end of the valve member (5) is a connection means (10), to engage to the spigot member (11), shown in FIG. 2.

The spigot member (11) is tubular having an internal bore (12) and comprises a threaded section (13) located at one end and a hose engaging section (14) located at the other end. The bore (12) having an opening (15) located in the threaded section (13) and an outlet (16) located at the hose engaging section (14). It is desirable that the opening (15) is located in the side wall of the threaded section (13) to allow for non restricted flow.

Figure 3:
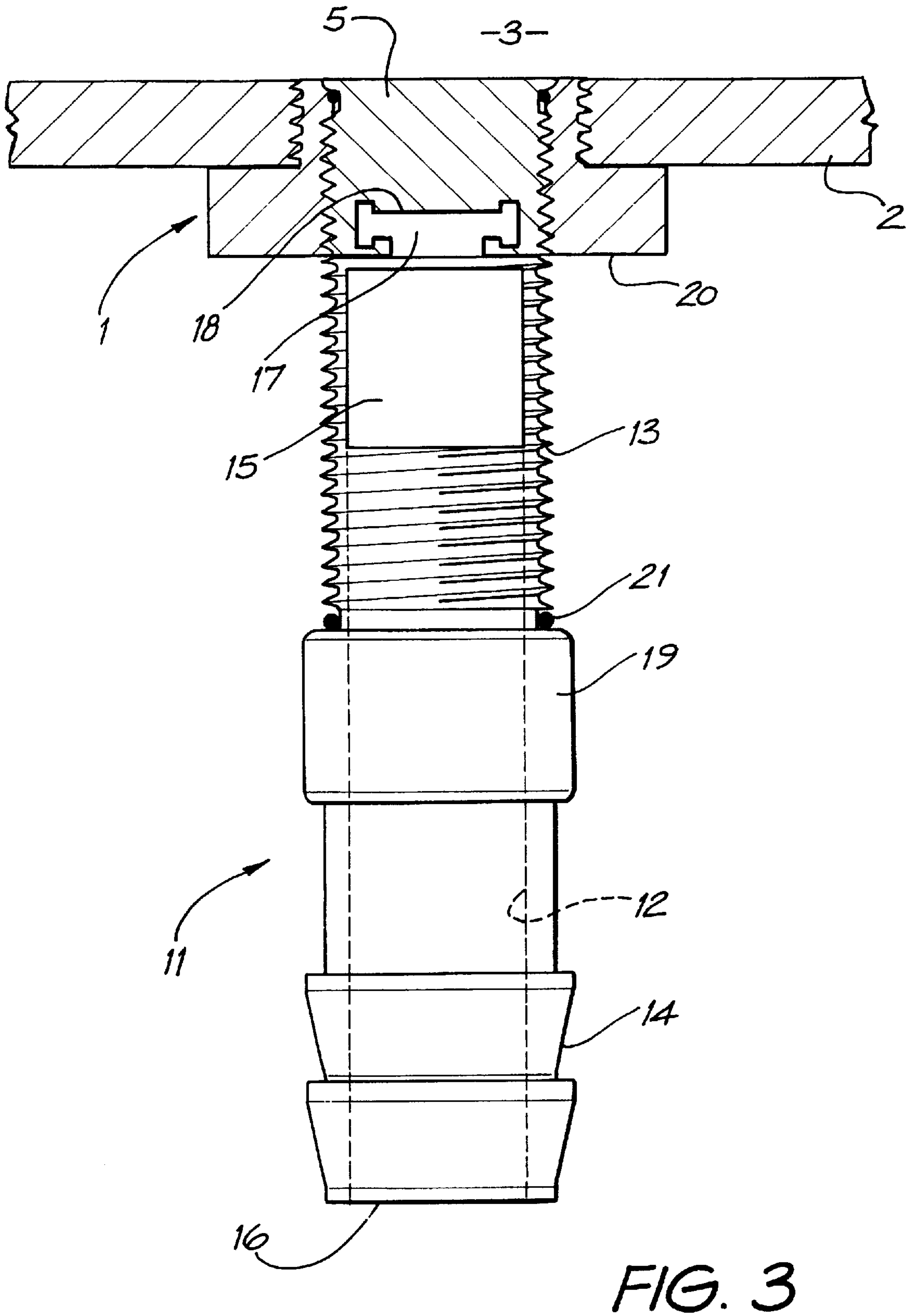
FIG. 3 illustrates a cross section through a schematic representation of the port member and valve of FIG. 1 engaged with the spigot member of FIG. 2, with the valve in its closed position.

As shown in FIG. 3 the spigot member has a connection means (17), which locks into the connection means (10) of the valve member (5) which is in the form of a recess (18). As it is essential that the threads of the threaded surface (6) of the valve member (5) and the threads of the threaded section (13) of the spigot member (11) align perfectly, the connection means must lock the two components rigidly in place. The connection means can be of any suitable form and can be releasable or non releasable, if required.

The two connection means (10 & 17) can be so constructed that they snap lock together when the connection means (17) of the spigot member (11) is engaged in the recess (18), and the spigot member (1) rotated in the direction to move the valve member (5) inwardly of the sump (3). The rotation of the spigot member is continued and the threads of the threaded section (13) being aligned with the threads of the threaded surface (6) of the spigot member (11) threads along the threaded bore (4) of the pot member (1), moving the valve member (5) into the sump (3).

Figure 4:
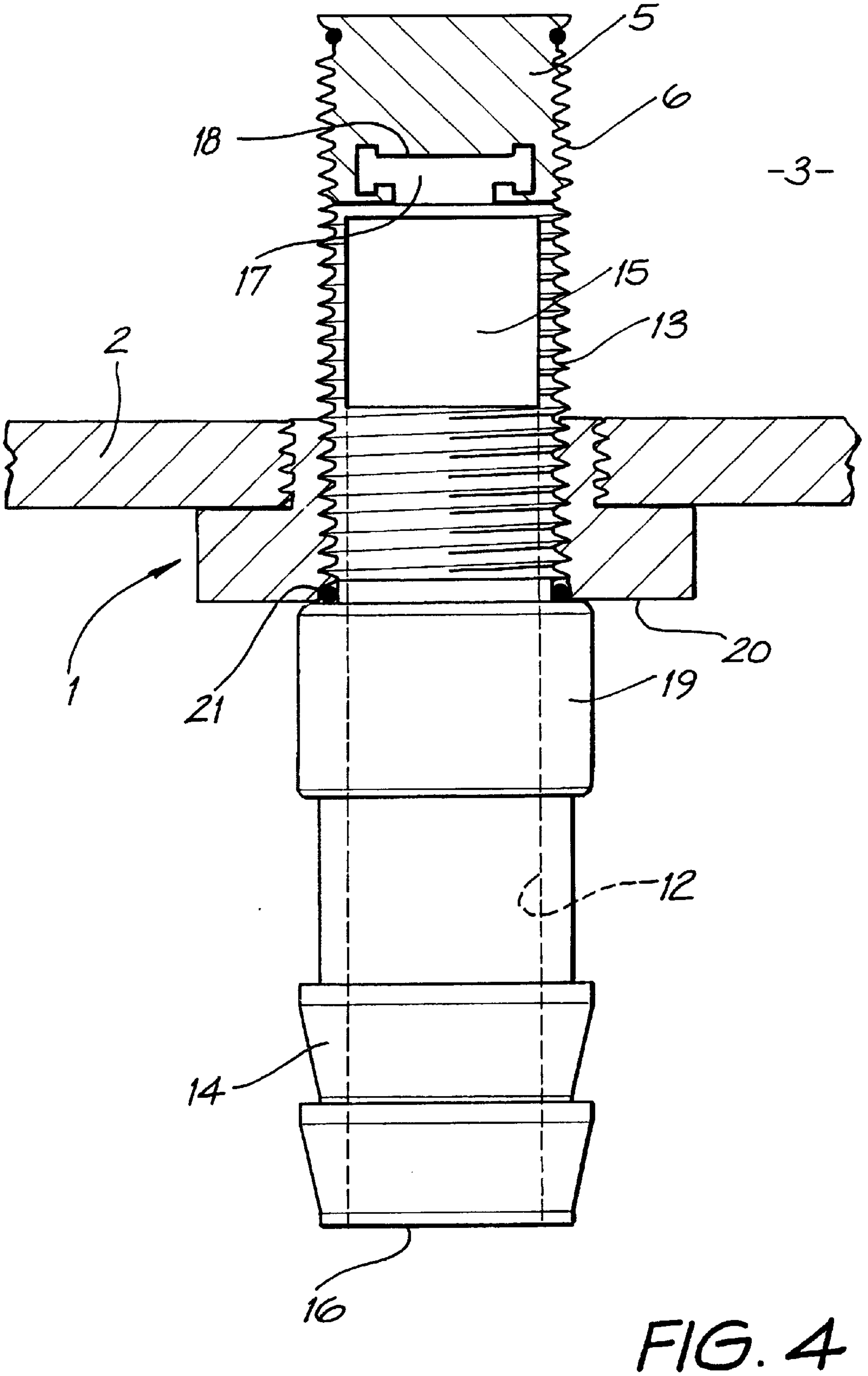
FIG. 4 illustrates a cross section through a schematic representation of the port member and valve of FIG. 1 engaged with the spigot member of FIG. 2, with the valve in its fully open position.

The rotation is continued until the spigot member (11) reaches the position shown in FIG. 4, where the shoulder (19) of the spigot member (11 ) abuts against the collar (20) of the port member (1), with the sealing ring (21) providing a liquid tight seal between the spigot member (11) and the collar (20) of the port member (1). Thus the opening (15) is beyond the port member (1) allowing uninterrupted flow into the spigot member (1). If required to direct the discharging oil, a hose could be attached to the hose engaging section (14) of the spigot member (11).

When the port member (1) is to be closed, the spigot member (11) is rotated in the direction to close the valve member (5) until the valve member (5) is fully closed and the rotation of the spigot member (11) is continued, where the additional rotation disengages the snap lock between the connection means (17) of the spigot member (11) and the recess (18) of the valve member (5), freeing the spigot member (11) from the valve member (5).

Apart from the above snap lock form the connection means can be of any suitable form such as a bayonet style fitting, releasable locking fingers, a pin lock, or a socket with a releasable ball bearing lock and a mating spigot such as in a socket wrench set.

It should be obvious to people skilled in the art that modifications and alterations can be made to the above described invention without departing from the scope or the spirit of the present invention.

The claims defining the invention are as follows:

1. An access port, adapted to allow access to liquid held in a container, comprising:

a port member adapted to threadedly engage in a hole in said container, having a threaded bush with a flange located at on end, and an internal threaded bore extending through the bush from the flange to the other end of the bush with an annular valve seat, located at said other end and surrounding said bore, said flange abutting against the external wall of the container and the valve seat being located internal of the container;

a valve member, having an annular valve seal at one end larger in diameter than the internal diameter of the internal threaded bore of the port member, and a threaded external surface adapted to engage with the threaded internal bore of said port member, so as to move, inwardly with respect to said container, along said internal bore between a first sealing position where said annular valve seal, seals against said annular valve seat of said port member, and a second open position where liquid from said container is free to flow through said bore;

a first connection means located on said valve member;

a spigot member having an internal bore communicating between a first opening located adjacent a first end of said spigot member and a second opening located adjacent a second end of the spigot member; the spigot member having an external thread located at the first end identical to that of the thread of the external surface of the valve member, such that when the spigot member is connected to the valve member the threads on the outer surface of the valve and the spigot member align to allow the valve member and the spigot member to move as a single unit along the thread of the internal bore of the port member;

a second connection means located at said first end of said spigot member, and adapted to engage with said first connection means, whereby, in use, with said second connection means engaged with said first connection means, said spigot member is moved inwardly relative to the container forcing said valve member, to move inwardly relative to said container moving said annular valve seal out of engagement with said annular valve seat, to its first open position and positioning said first opening of said spigot in communication with the liquid in the container, allowing the liquid to flow from said container out of the second opening of the spigot.

2. An access port according to claim 1 wherein the valve member, in its fully sealing position, extends along the internal threaded bore of the port member, such that its second end is substantially flush with the flange of the port member.

3. An access port according to claim 1, wherein the valve seal has an o-ring to assist in sealing with the valve seat.

4. An access port according to claim 1, wherein the first opening in said spigot is located in the side wall of the spigot.

5. An access port according to claim 1, wherein the said first connection means and the said second connection snap lock together.

6. An access port according to claim 1, wherein the first connection and the second connection releasably engage together.

* * * * *